US011790190B2

(12) United States Patent
Mei et al.

(10) Patent No.: US 11,790,190 B2
(45) Date of Patent: Oct. 17, 2023

(54) OBJECT IDENTIFICATION

(71) Applicant: Palo Alto Research Center Incorporated, Palo Alto, CA (US)

(72) Inventors: Ping Mei, San Jose, CA (US); Janos Veres, San Jose, CA (US); Robert Street, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 461 days.

(21) Appl. No.: 16/704,392

(22) Filed: Dec. 5, 2019

(65) Prior Publication Data

US 2021/0174036 A1 Jun. 10, 2021

(51) Int. Cl.
*G06K 7/10* (2006.01)

(52) U.S. Cl.
CPC ................. *G06K 7/10366* (2013.01)

(58) Field of Classification Search
USPC ........................................ 235/451
See application file for complete search history.

(56) References Cited

U.S. PATENT DOCUMENTS

| 9,874,984 B2 | 1/2018 | Mei et al. | |
| 2012/0305320 A1* | 12/2012 | Sun | G01G 23/42 177/25.13 |
| 2018/0114184 A1* | 4/2018 | Brooks | G01G 19/42 |
| 2020/0117972 A1* | 4/2020 | Weigelt | G06K 7/08 |

FOREIGN PATENT DOCUMENTS

| CN | 107209867 A | * | 9/2017 | ........... G06K 19/067 |
| CN | 105122324 B | * | 12/2019 | ............. G06K 17/00 |
| WO | WO-2005027032 A1 | * | 3/2005 | ............. G06K 1/121 |

* cited by examiner

*Primary Examiner* — Thien M Le
*Assistant Examiner* — Tae W Kim
(74) *Attorney, Agent, or Firm* — Mueting Raasch Group

(57) ABSTRACT

A system includes a structure configured to hold items, at least one capacitive touch sensor, and an item scanner configured to move the capacitive touch sensor relative to the structure and to identification elements disposed on the items held by the structure. Each identification element represents a multi-digit code. The capacitive touch sensor is configured to generate a sensor signal comprising sequences of waveforms in response to movement of the capacitive touch sensor relative to the identification elements. Each sequence of waveforms includes the multi-digit code that identifies one of the items.

15 Claims, 15 Drawing Sheets

OBJECT IDENTIFICATION

BACKGROUND

It can be useful to collect information about items displayed for sale at a customer interaction point, sometimes referred to as a "smart shelf". The collected information can be used to log consumer interactions with the product, update product inventory, and/or other purposes.

BRIEF SUMMARY

Some embodiments are directed to a system that includes a structure configured to hold items, at least one capacitive sensor, and an item scanner configured to move the capacitive sensor relative to the structure and to identification elements disposed on the items held by the structure. Each identification element represents a multi-digit code. The capacitive sensor is configured to generate a sensor signal comprising sequences of waveforms in response to movement of the capacitive sensor relative to the identification elements. Each sequence of waveforms includes the multi-digit code that identifies one of the items.

Some embodiments involve an identification element comprising a pattern of multiple regions. The pattern of multiple regions includes at least a first region having a first dielectric constant and a second region having a second dielectric constant that is different from the first dielectric constant. The identification element can be disposed on an item and the pattern of multiple regions represents a multi-digit code that identifies the item.

According to some embodiments, a system comprises a structure configured to hold items. The system further includes a touch implement configured to cause a swiping touch across multiple touch sensors of each item as the item is removed from the structure or placed in the structure. A reader generates an excitation signal and receives a response signal from the item. The response signal includes a sequence of electronic waveforms generated in response to the excitation signal and the swiping touch. The sequence of electronic waveforms includes a multi-digit code. A processor configured to extract the code from the response signal and to identify the removed or replaced item based on the code.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Acquiring information from interaction points where consumers interact with products can be useful for maintaining good inventory records and/or or for logging consumer shopping behavior. Approaches describe herein include a "smart shelf" system implemented using capacitive sensing.

Figure 1:
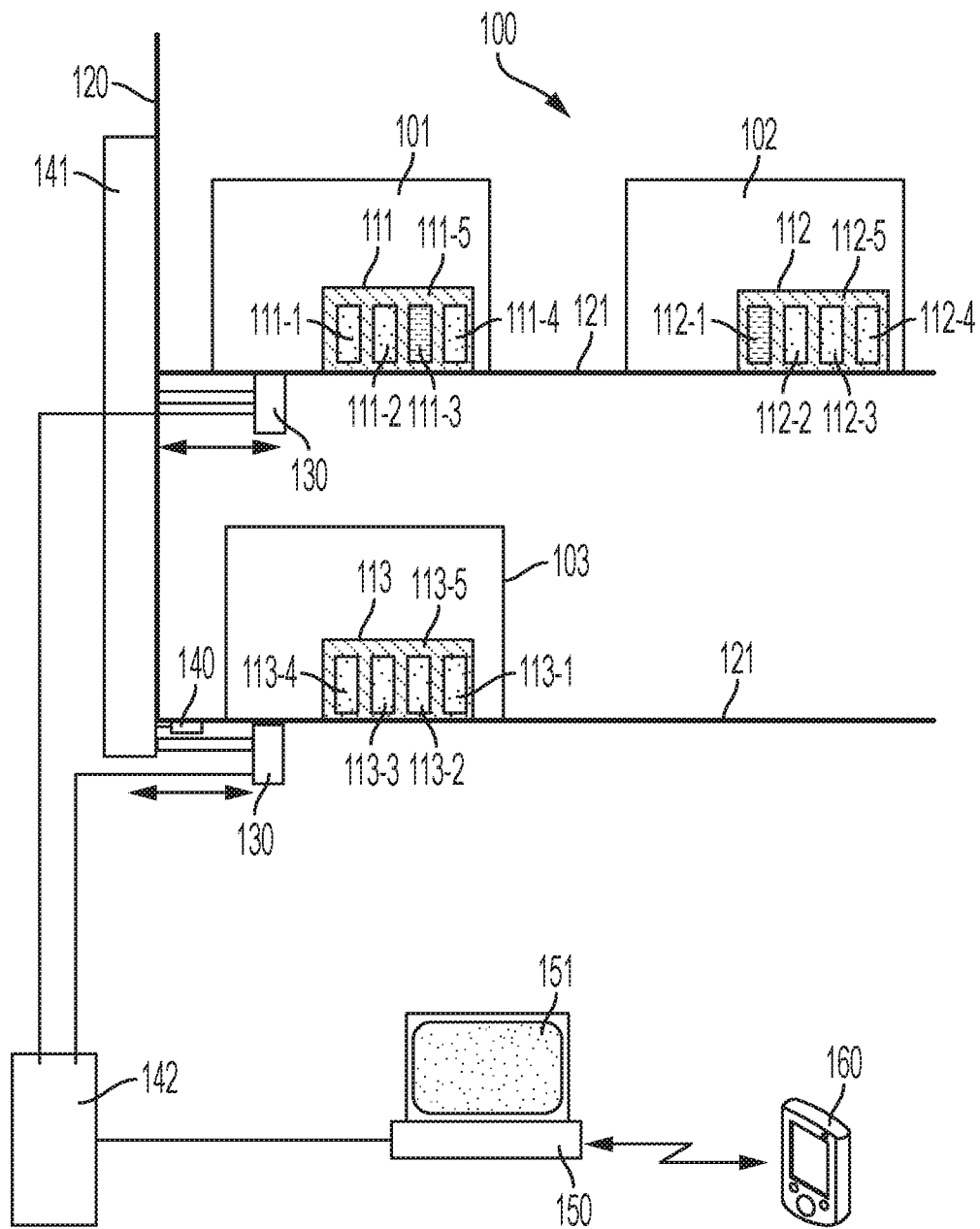
FIG. 1 is a block diagram of a system capable of identifying items on a structure in accordance with some embodiments.

FIG. 1 is a block diagram of a system 100 capable of identifying items on a structure. The system 100 includes a structure 120 configured to hold items 101, 102, 103. For example the structure 120 may comprise one or more racks, shelves, or other features 121 that hold the items 101, 102, 103 in the structure 120 as shown in FIG. 1. The system 100 includes at least one capacitive sensor 130 arranged to capacitively detect sense identification elements 111, 112, 113 disposed on the items 101, 102, 103. Each identification element 111, 112, 113 includes material regions 111-1-111-5, 112-1-112-5, 113-1-113-5 having varying dielectric constants. A multi-digit code that identifies the item 101, 102, 103 is encoded in the variation of dielectric constants of the material regions 111-1-111-5, 112-1-112-5, 113-1-113-5.

An item scanner 141 is configured to scan the sense identification elements 111, 112, 113 disposed on the items 101, 102, 103. The scanner 141 is configured to move one or more capacitive sensors 130 relative to the structure 120 and to the sense identification elements 111, 112, 113. The scanner 141 may comprise a stepper motor and belt or any other mechanism suitable to move the capacitive sensor 130 relative to the identification elements 111, 112, 113.

The item scanner 141 may be configured to scan the items according to a predetermined time schedule, e.g., once per second or once per minute, etc. In some embodiments, the structure includes a sensor 140 that detects when an item has been removed from the structure or placed in the structure. For example, the sensor 140 may comprise a load cell that detects a change in the weight supported by the structure. In other embodiments, the sensor may comprise an optical sensor that optically detects removal of an item from the structure or placement of an item in the structure; the sensor may include a magnetic sensor that magnetically detects removal of the item. In embodiments that include a sensor 140, the output of the sensor 140 may trigger the scanner 141 to scan the items 101, 102, 103 in the structure 120.

In response to movement of the capacitive sensor 130 relative to the sense identification elements 111, 112, 113, the capacitive sensor 130 generates a sensor signal comprising sequences of waveforms. Each sequence of waveforms represents a multi-digit code that identifies one of the items 101, 102, 103. For example, as the sensor 130 moves past regions 111-1, 111-2, 111-3, 111-4, 111-5 of identification element 111, a sensor signal comprising a sequence of waveforms that includes the multi-digit code for item 101 is generated at an output of the sensor 130.

Optionally, in some embodiments, the capacitive sensor 130 is coupled to a reader 142 that receives the sensor signals 142. The reader 142 may be communicatively coupled to the sensor 130 by a wireless connection, for example. The reader 142 can be configured to generate an electromagnetic interrogation signal that is transmitted wirelessly to the sensor 130 to interrogate the sensor 130. In response to the interrogation signal from the reader 142, the sensor 130 transmits an electromagnetic response signal to the reader 142. The response signal comprises some representation of the multi-digit code. In some embodiments, the electromagnetic interrogation signal generated by the reader may provide power to the sensor 130.

Optionally, the system 100 may further include a processor 150 configured to extract the multi-digit codes from the response or sensor signal and provide information about items on the structure 120 based on the extracted multi-digit codes. The processor 150 may be coupled to the reader circuitry 142 or directly to the sensor 130 by a wireless or wired connection.

For example, the processor 150 may provide information that items 101, 102, 103 have been removed from or placed on the structure 120 based on the extracted multi-digit codes. As another example, the processor 150 may optionally compare the codes extracted from the response signal to a stored inventory list of item codes and determine one or more items that have been removed from or placed on the structure 120 based on the comparison. Optionally, the processor 150 may maintain logs of consumer interactions with the items 101, 102, 103 based on the removal of the items 101, 102, 103 from the structure 120 and/or placement or replacement of items 111, 112, 113 on the structure. For example, the processor 150 may log the number of times the item was removed from the shelf and then replaced and/or the number of times the item was removed from the shelf and not replaced. The processor 150 may also be configured to identify misplaced items on the structure, e.g., items that do not belong on the structure.

In some embodiments the system 100 can include an output device, such as the display 151 shown in FIG. 1. The output device 151 may be configured to display information such as a list of items presently on the structure and/or reports of consumer interactions with the items. In some embodiments, the processor 150 may identify the item that has been removed by comparing a previous scan at which the item was present in the structure to a more recent scan of the items in which the item was not present in the structure. If the processor 150 determines that an item has been removed, e.g., by a consumer or other user, the processor 150 may wirelessly send product information about the item to an application running on the consumer's or user's hand held device 160.

Figure 2:
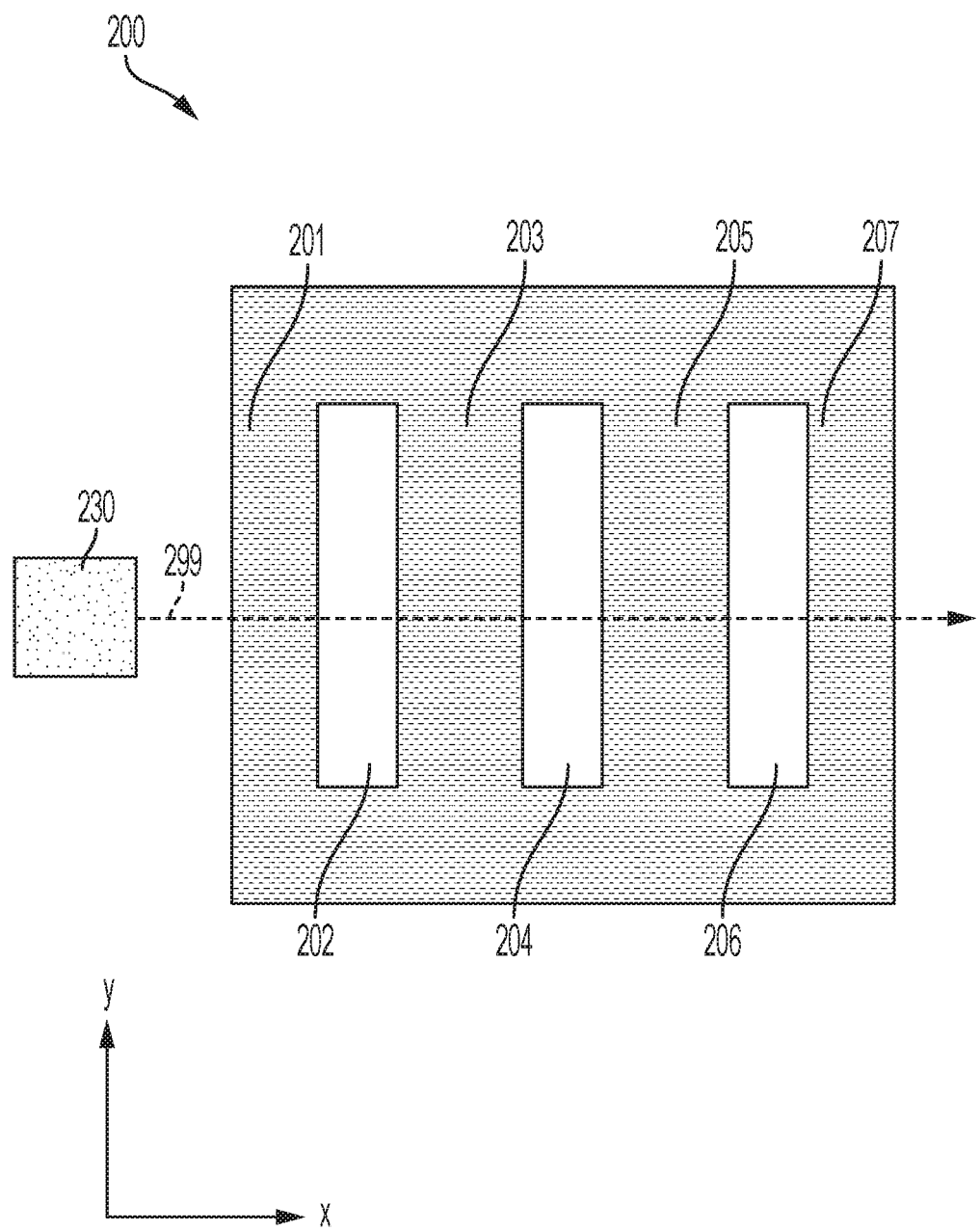
FIG. 2 is a diagram illustrating an item identification element in accordance with some embodiments.

FIG. 2 is a diagram illustrating an item identification element 200 in accordance with some embodiments. The identification element 200 includes a pattern of multiple regions 201-207. The pattern includes one or more first regions 201-207 having a first dielectric constant, $\varepsilon_1$, and one or more second regions 202-206 having a second dielectric constant, $\varepsilon_2$, wherein $\varepsilon_1 \neq \varepsilon_2$. The pattern of multiple regions 201-207 having varying dielectric constants represent a multi-digit code that identifies the item.

FIG. 2 shows a path 299 of a capacitive sensor 230 across the regions 201-207. As the capacitive sensor 230 moves along the x axis past regions 201-207, the sensor 230 encounters regions 201-207 having dielectric constant that varies between $\varepsilon_1$ and $\varepsilon_2$. Responsive to the variation in the dielectric constant, the response signal at the output of the reader (not shown), includes a sequence of waveforms having a variation that corresponds to the variation in dielectric constant. Thus a multi-digit code is encoded in the pattern of varying dielectric constants of the regions 201-207 of the identification element 200.

Figure 3:
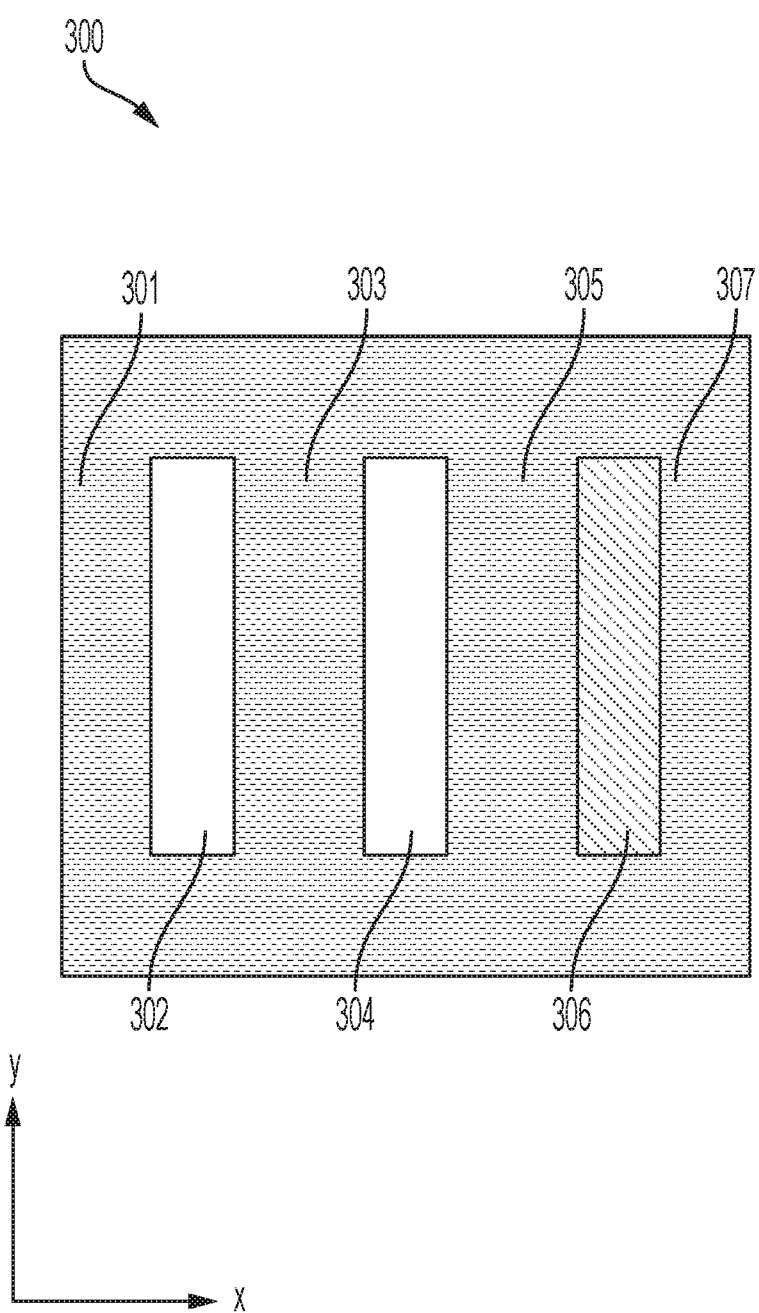
FIG. 3 shows an identification element having first, second, and third regions having different dielectric constants in accordance with some embodiments.

In some embodiments, an identification element may include regions having three, four, or more different dielectric constants. FIG. 3 shows an identification element 300 having one or more first regions 301-307 having a first dielectric constant, $\varepsilon_1$, one or more second regions 302, 304 having a second dielectric constant, $\varepsilon_2$, and one or more third regions 306 having a third dielectric constant, $\varepsilon_3$, wherein $\varepsilon_1 \neq \varepsilon_2 \neq \varepsilon_3$. Materials suitable for the regions of the identification devices 200, 300 include glass, plastic, hydrogel, polyvinylidene difluoride (PDVF), and/or other suitable materials.

Figure 4:
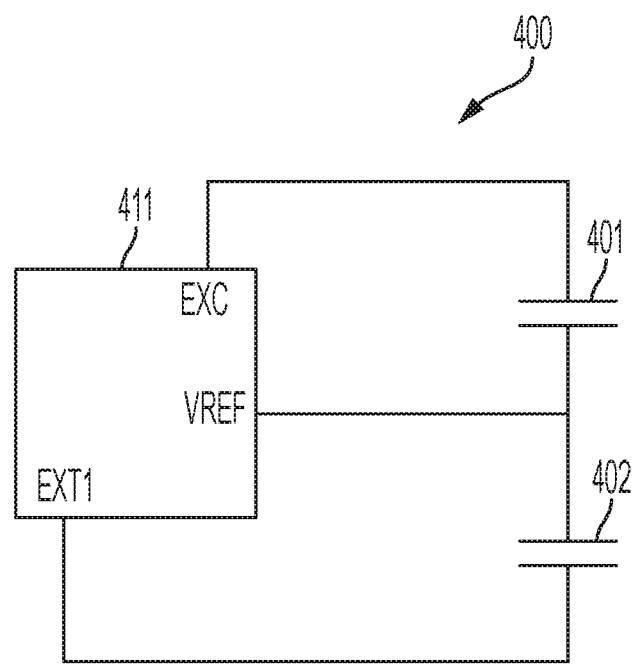
FIG. 4 is a schematic diagram of a version of reader circuitry that may be used in the system of FIG. 1.

FIG. 4 is a schematic diagram of a version of a capacitive sensor 400 that may be used in the system 100 of FIG. 1. Many schematic configurations for the disclosed capacitive sensor 400 are possible and FIG. 4 provides one implementation discussed here for purposes of illustration and not limitation.

In the illustrated embodiment, a sensor excitation voltage, e.g., an AC voltage, is provided to the circuitry 400 at terminal EXC. As indicated in FIG. 4, VREF is a reference voltage for the sensor excitation voltage. The output of the reader circuitry at EXT1 is characterized by the equation:

$$V_{EXT1} = V_{REF} \frac{C_{REF}}{C_{REF} + C_{SENS}},$$

where $C_{REF}$ is a fixed reference capacitance of reference capacitor 402 and $C_{SENS}$ is the capacitance of sense capacitor 401. The sense and reference capacitors 401, 402 may comprise any type of capacitors suitable for the application. Several possible embodiments for the sense capacitor 401 are discussed below with reference to FIGS. 14 and 15.

The capacitance $C_{SENS}$ of the sense capacitor 401 is altered as the sense capacitor 401 moves proximate to first and second materials having different dielectric constants. As the sense capacitor 401 is swept past the identification element, the regions having different dielectric constants cause a variation in $C_{SENS}$. The variation in $C_{SENS}$ alters the current being carried in the sense capacitor output and causes a variation in the electronic waveform generated at EXT1.

FIGS. 5A through 6B illustrate various identification elements 500, 600 and the waveforms 590, 690 generated at EXT1 when the capacitive sensor discussed in connection with FIG. 4 scans across the regions of the identification elements.

Figures 5A, 6A:
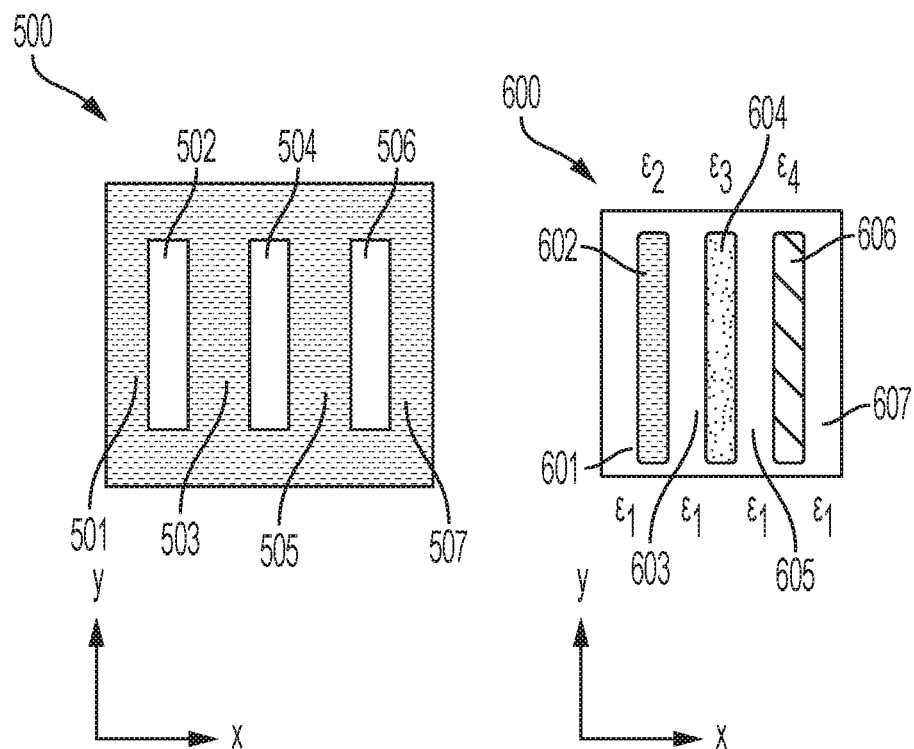
FIG. 5A shows an identification element comprising first regions and second dielectric regions in accordance with some embodiments.
FIG. 6A shows an identification element comprising first, second, and third dielectric regions in accordance with some embodiments.

FIG. 5A shows an identification element 500 comprising first regions 501, 503, 505, 507 having a first dielectric constant and second regions 502, 504, 506 having a second dielectric constant different from the first dielectric constant.

Figures 5B, 6B:
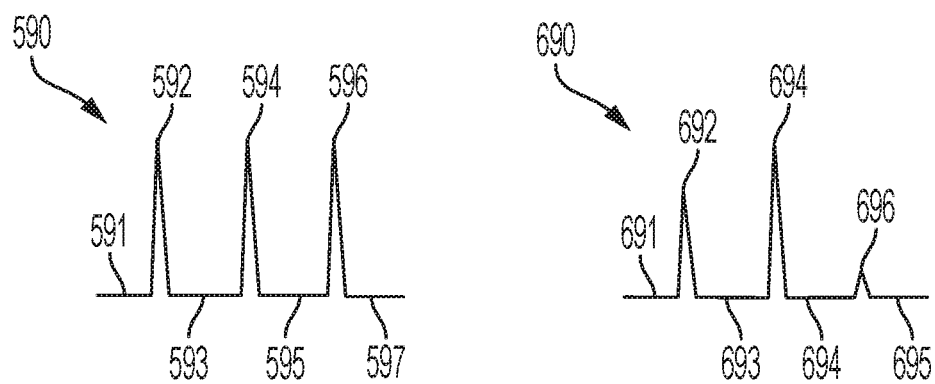
FIG. 5B shows the response signal including a sequence of waveforms generated as a capacitive sensor sweeps across the dielectric regions of the identification element of FIG. 5A.
FIG. 6B shows the response signal that includes a sequence of waveforms generated as a capacitive sensor sweeps across the dielectric regions of the identification element of FIG. 6A.

FIG. 5B shows the response signal 590 including a sequence of waveforms generated as a capacitive sensor sweeps across the dielectric regions 501-507 along the x-axis at constant velocity. The sequence of waveforms includes waveform 592 (a positive going peak) that is generated when the capacitive sensor sweeps over region 502; waveform 594 (a positive going peak) that is generated when the capacitive sensor sweeps over region 504, and waveform 596 (a positive going peak) that is generated when the capacitive sensor sweeps over region 506. The response signal returns to the zero or nominal level at 591, 593, 595, 597 when the capacitive sensor sweeps across regions 501, 503, 505, and 507.

The amplitudes of the positive going peaks in FIG. 5B in waveforms 502, 504, and 506 have about the same amplitude and the amplitudes of the negative going peaks in waveforms 502, 504, and 506 have about the same amplitude. This result occurs because the regions 502, 504, and 506 have the same dielectric constant. The response signal amplitude returns to the same zero or nominal level at 591, 593, 595, and 597 because regions 501, 503, 505, and 507 have the same dielectric constant that is different from the dielectric constant of regions 502, 504, and 506.

In some embodiments, the identification element includes regions having more than two different dielectric constants as shown in FIG. 6A. FIG. 6A shows an identification element 600 comprising first regions 601, 603, 605, 607 having a first dielectric constant, $\varepsilon_1$, a second region 602 having a second dielectric constant, $\varepsilon_2$, a third region 603 having a third dielectric constant, $\varepsilon_3$, and a fourth region 604 having a fourth dielectric constant, $\varepsilon_4$, where $\varepsilon_1 \neq \varepsilon_2 \neq \varepsilon_3 \neq \varepsilon_4$.

FIG. 6B shows the response signal 690 that includes a sequence of waveforms generated as a capacitive sensor sweeps across the dielectric regions 601-607 along the x-axis at constant velocity. The sequence of waveforms includes waveform 692 (a positive going peak) that is generated when the capacitive sensor sweeps over region 602; waveform 694 (a positive going peak) that is generated when the capacitive sensor sweeps over region 604, and waveform 696 (a positive going peak) that is generated when the capacitive sensor sweeps over region 606. The response signal returns to the zero or nominal level when the capacitive sensor sweeps across regions 601, 603, 605, and 607.

The amplitudes of the positive going peaks in FIG. 6B in waveforms 602, 604, and 606 each have different amplitudes from one another. This result occurs because the regions 602, 604, 606 each have different dielectric constants, $\varepsilon_2$, $\varepsilon_3$, $\varepsilon_4$, respectively. The response signal amplitude returns to the same zero or nominal level at portions 691, 693, 695, and 697 of the response signal 690 because regions 601, 603, 605, and 607 have the same dielectric constant, $\varepsilon_1$, that is different from the dielectric constant of regions 602, 604, and 606.

Figure 7A:
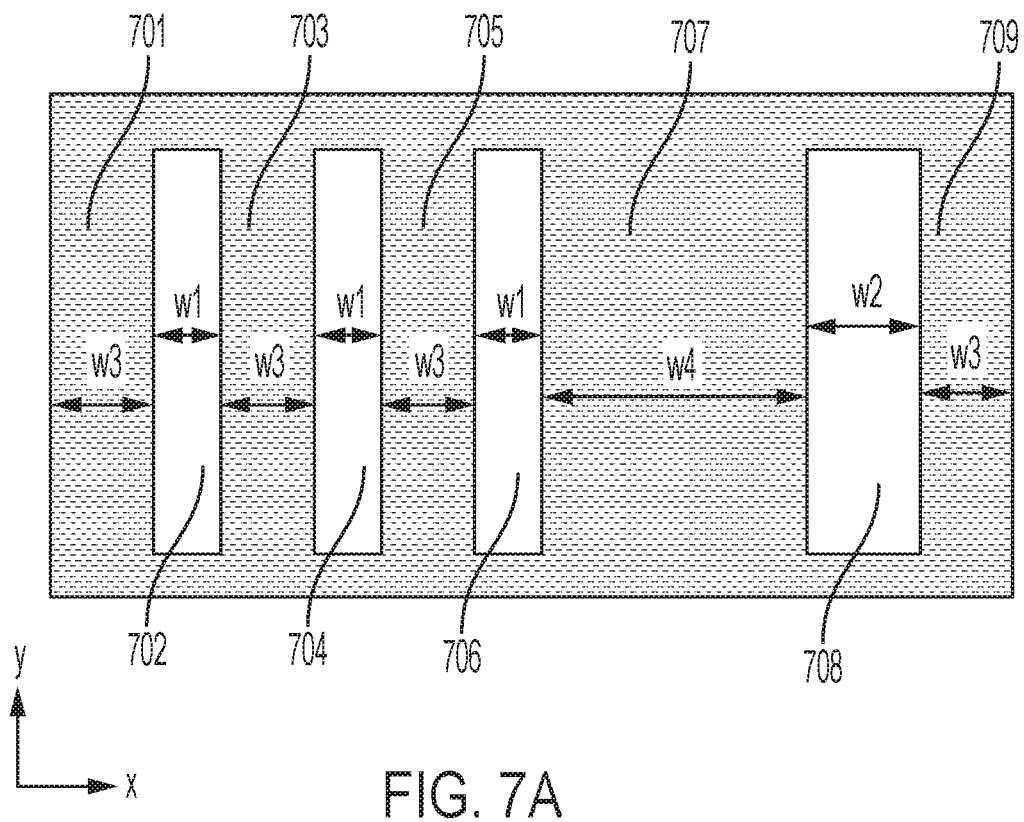
FIG. 7A shows an identification element comprising dielectric regions of varying widths in accordance with some embodiments.
Figure 7B:
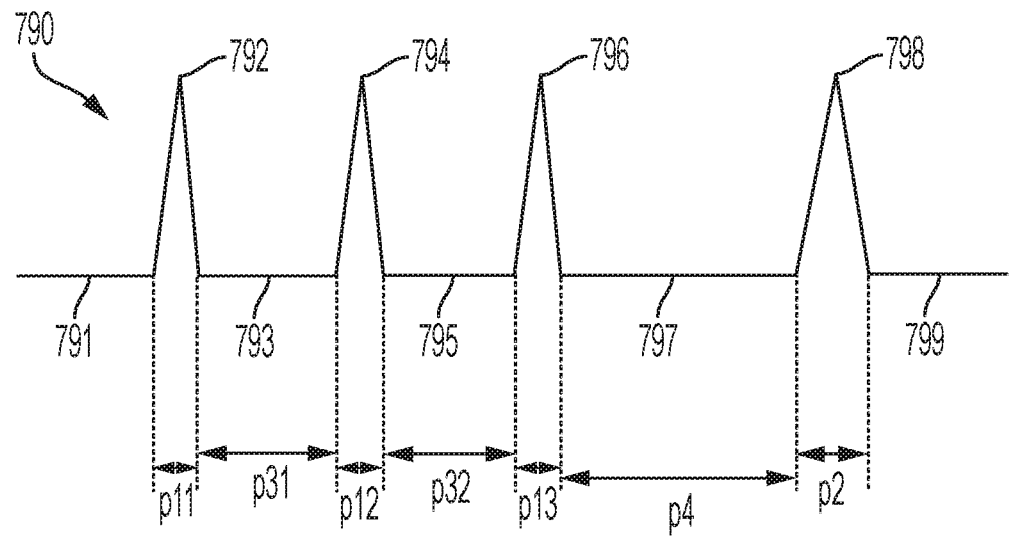
FIG. 7B shows the response signal that includes a sequence of waveforms generated as a capacitive sensor sweeps across the dielectric regions of the identification element of FIG. 7A.

As discussed above, the multi-digit code can be encoded in the pattern of regions in the identification element having different dielectric constants. The different dielectric constant materials cause the response signal to include waveforms of different amplitudes. Additionally or alternatively, the regions of the identification element may include other variations that encode the multi-digit code. For example, as illustrated by FIGS. 7A and 7B, the multi-digit code can be encoded in the spacings between the regions of different dielectric constant. FIG. 7A shows an identification element 700 comprising regions 701, 703, 705, 707, 709 having a first dielectric constant, $\varepsilon_1$, and second regions 702, 704, 706, 708 having a second dielectric constant, $\varepsilon_2$, where $\varepsilon_1 \neq \varepsilon_2$. In addition to variation in dielectric constant, regions 701-709 also vary in width. Regions 702, 704, and 706 have width $w_1$; region 708 has width $w_2$; regions 701, 703, 705 and 709 have width $w_3$; and region 707 has width $w_4$.

The varying widths of the regions 701-709 affects the timing of the waveforms in the response signal 790 as illustrated by FIG. 7B. FIG. 7B shows the response signal 790 that includes a sequence of waveforms generated as a capacitive sensor sweeps across the dielectric regions 701-709 along the x-axis at constant velocity. The sequence of waveforms includes waveform 792 (a positive going peak) that is generated when the capacitive sensor sweeps over region 702; waveform 794 (a positive going peak followed by a negative going peak) that is generated when the capacitive sensor sweeps over region 704, waveform 796 (a positive going peak) that is generated as the capacitive sensor sweeps over region 706, and waveform 798 (a positive going peak) that is generated as the capacitive sensor sweeps over region 709. The response signal 790 returns to the zero or nominal level as the capacitive sensor sweeps across regions 701, 703, 705, 707, and 709. The multi-digit code is encoded in the waveforms 792, 794, 796 and 798 generated by regions 701-709 having a pattern of differing dielectric constant and also in the time periods $p_{11}$, $p_{12}$, $p_{13}$, $p_2$ of the waveforms 792, 794, 796, 798 and the time periods $p_{31}$, $p_{32}$, $p_4$ between the waveforms 792, 794, 796, 798.

The time periods $p_{11}$, $p_{12}$, $p_{13}$ of waveforms 792, 794, 796 are equal to one another because they correspond to regions 702, 704, 706 that have equal width, $w_1$. The time period $p_2$ of waveform 798 is greater than $p_{11}$, $p_{12}$, and $p_{13}$ because time period $p_2$ corresponds to region 708 having width $w_2 > w_1$. Time period $p_{31}$ between waveforms 792 and 794 and time period $p_{32}$ between waveforms 794 and 796 are equal because they correspond to regions 703, 705 that have the same width, $w_3$. Time period $p_4$ between waveforms 796 and 798 is greater than time periods $p_{31}$ and $p_{32}$ because time period $p_4$ corresponds to region 707 which has width $w_4 > w_3$. The processor can discriminate between different identification elements based on the multi-digit code which is encoded in the number of waveforms, the amplitudes of the waveforms, the time periods of the waveforms, and/or the time periods between the waveforms.

Figure 8:
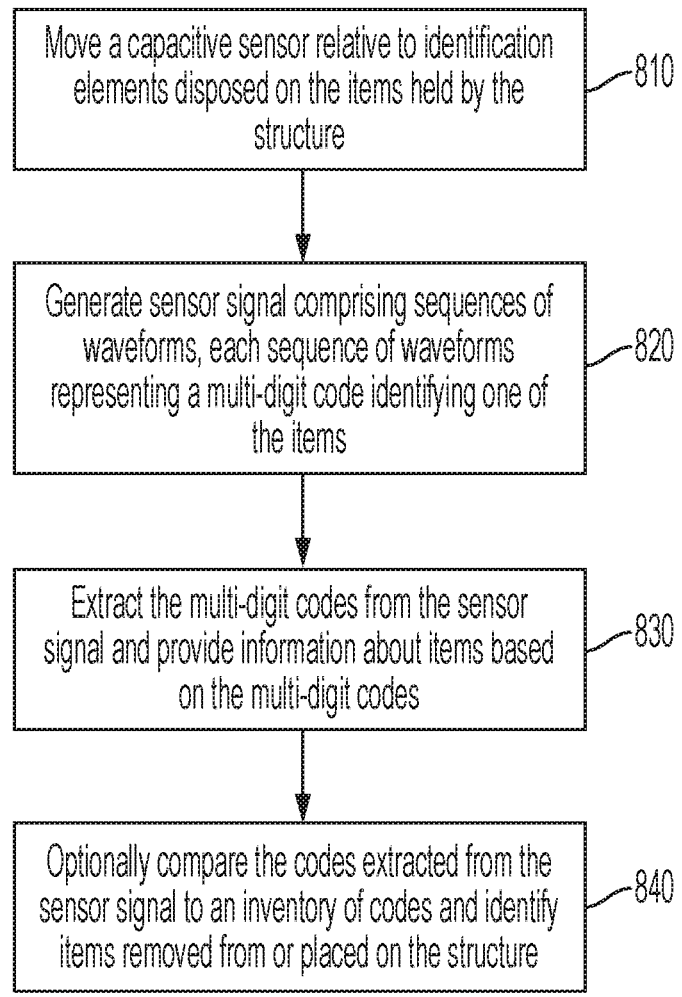
FIG. 8 is a flow diagram representing a process of identifying objects on a structure in accordance with some embodiments.

FIG. 8 is a flow diagram representing a process of identifying objects on a structure. The method involves moving 810 a capacitive sensor relative to identification elements disposed on items held by a structure. A sensor signal is generated 820 in response to moving the capacitive sensor relative to the identification elements. The sensor signal comprises sequences of waveforms, wherein each sequence of waveforms represents a multi-digit code identifying at least one of the items. The multi-digit codes can be extracted 830 from the sensor signal and used as a basis for further action. For example, information about the items can be provided based on the extracted multi-digit codes. The extracted multi-digit codes can optionally be compared 840 to a previous inventory list of codes to determine a current inventory and/or to update the inventory based on items that are present in the structure. Other appropriate actions can be taken in response to extracting the multi-digit codes.

According to some embodiments, capacitive sensors may be disposed on the items themselves rather than on the structure. Each item may include an identification device comprising an arrangement of touch sensitive elements, e.g., capacitive touch sensors that correspond to a multi-digit code. The structure includes a touch implement that activates the capacitive sensors as the items are removed from or placed in the structure. The touch implement comprises a dielectric material which has a much higher dielectric constant than nearby structures. The touch implement can include high dielectric material such as PVDF, hydrogel, rubber and/or other materials that have a dielectric close to the dielectric of a human finger. As used herein a "touch" occurs when the touch implement physically contacts a sensor or is brought sufficiently close to the sensor to activate the capacitive sensor.

Figure 9A:
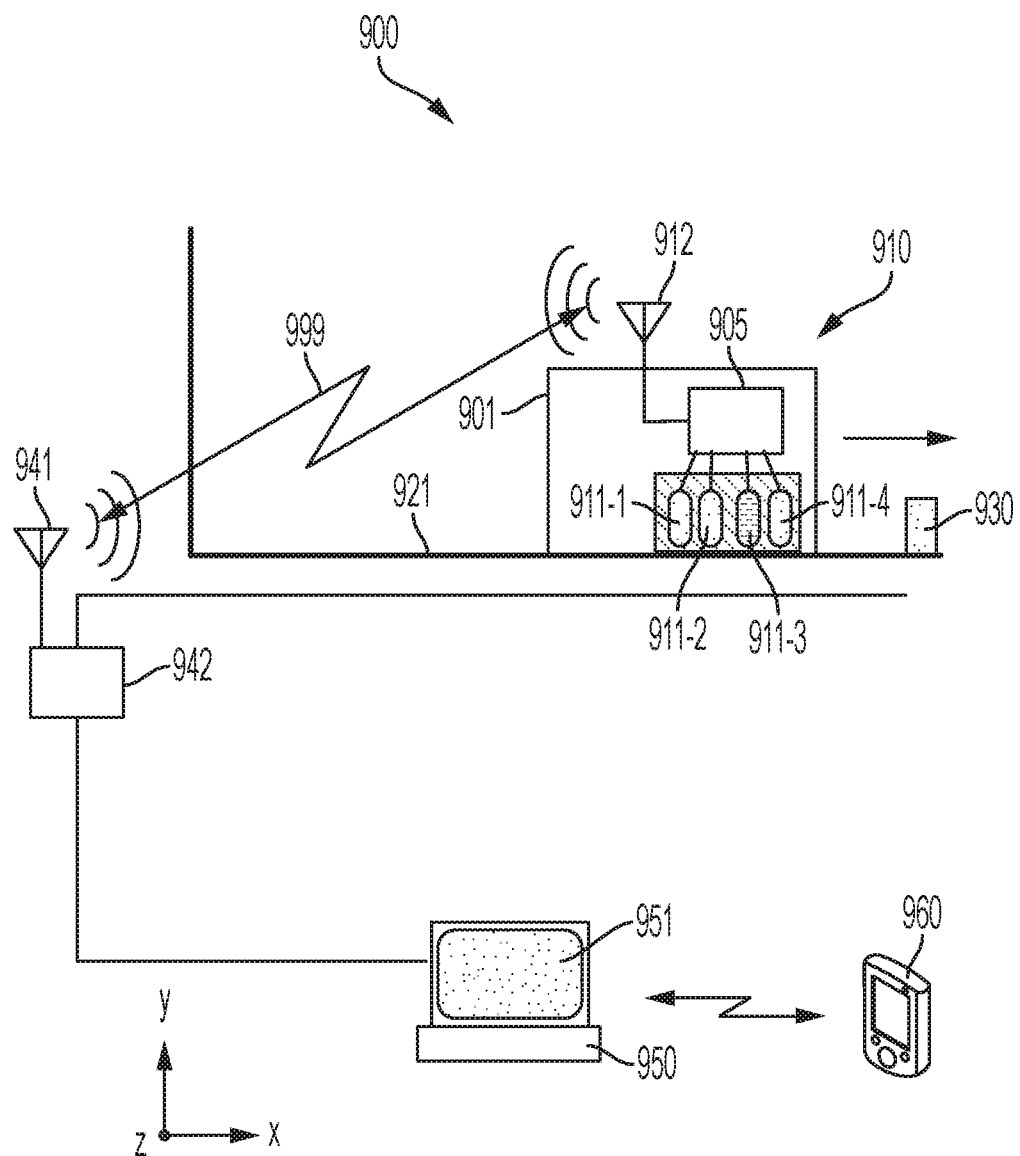
FIGS. 9A and 9B are block diagrams showing side and front perspectives of a system for identifying items held by a structure in accordance with some embodiments.
Figure 9B:
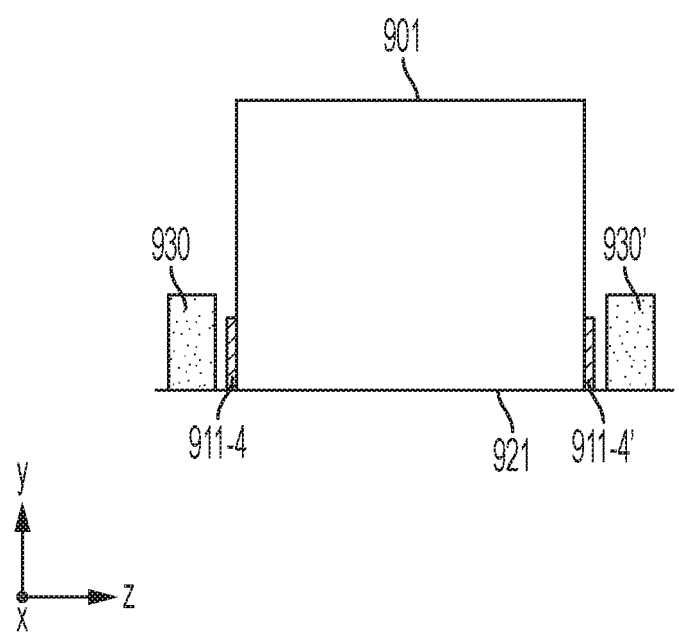

FIGS. 9A and 9B are block diagrams showing side and front perspectives of a system 900 for identifying items 901 held by a structure 921 in accordance with some embodiments. The items 901 held by the structure 921 each include at least one identification device 910 that includes multiple touch sensors 911-1-911-4 and a transponder 905. The identification device 910 communicates with a reader 942 over a wireless communication link.

The identification device 910 can be wirelessly powered by excitation signals generated by a reader 942. The transponder 905 receives excitation signals generated by the reader 942 through an antenna 912. The transponder 905 harvests energy from the excitation signal to power the identification device 910.

The identification device 910 comprises multiple touch sensors 911-1-911-4 that can be activated by a touch implement 930 which is a component of the structure 921. The touch implement 930 emulates a finger touch, for example. The sensors 911-1-911-4 are electrically coupled to the transponder 905 and are configured to produce electronic waveforms in response to contact with or proximity to the implement 930. The sensors 911-1-911-4 can be arranged to generate a sequence of electronic waveforms representing a sequential multi-digit code that identifies the item in response to a swiping contact or proximity of the touch implement 930 across the touch sensors 911-1-911-4. The structure 921 can be configured such that the swiping contact or proximity of the implement 930 occurs as the item 901 is removed from the structure 921 or is placed in the structure 921. The touch implement 930 may be biased toward the touch sensors 911-1-911-4, e.g., by a spring, an elastomeric article, or other biasing element, to facilitate contact or close proximity to the sensors 911-1-911-4 as the item 901 is drawn from the structure 120 or placed in the structure 120.

The transponder 905 is electrically connected to the touch sensors 911-1-911-4 so as to receive the sequence of electronic waveforms generated by the touch sensors 911-1-911-4 in response to the proximate touch implement 930. The transponder 905 transmits a transponder response signal that includes the sequence of electronic waveforms through the antenna 912 to the antenna 941 of the reader 942.

A processor 950 coupled to the reader 942 extracts the multi-digit code that identifies the item 901 removed or replaced in the structure 921 from the response signal. The processor 950 can use the identification of items removed or replaced in the structure to maintain inventory, to log consumer interactions with various items, to detect misplaced items, and/or for other useful purposes. In some embodiments, the processor 950 may include an output device 951 that displays information associated with the identified item. In some embodiments, the processor 950 may wirelessly transmit information about the item to an external device 960, e.g., a handheld device.

FIG. 9B shows an end view of the item 901 on the structure 921 as the item 901 is being removed from the structure 921 along the x axis. As the item 901 moves along the x axis, the touch sensors 911-1-911-4 sequentially move past the touch implement 930 starting with touch sensor 911-4 which is shown in FIG. 9B and ending with touch sensor 911-1 shown in FIG. 9A. As the sensors move past the touch implement, a sequence of waveforms are generated that represent a multi-digit code. These waveforms are included in the response signal transmitted from the transponder 905 to the reader 942.

In some embodiments, the item 901 may include a second set of sensors including touch sensor 911-4' disposed on a side of the item 902 opposite the first set of touch sensors 911-1-911-4. The second set of touch sensors move past a second touch implement 930' located on the opposite side of the structure 921 to the first touch implement 930. As the second set of touch sensors including sensor 911-4' move past the second touch implement 930' a second set of sequential waveforms are generated that represent a second multi-digit code. These second waveforms can be included in a second response signal from the transponder 905 to the reader 942.

The use of two sets of touch sensors and two touch implements as illustrated in FIG. 9B can be useful to confirm the identity of the item and/or to detect the direction that the object is moving, e.g., whether the item is being removed from the structure or placed in the structure.

Figure 10A:
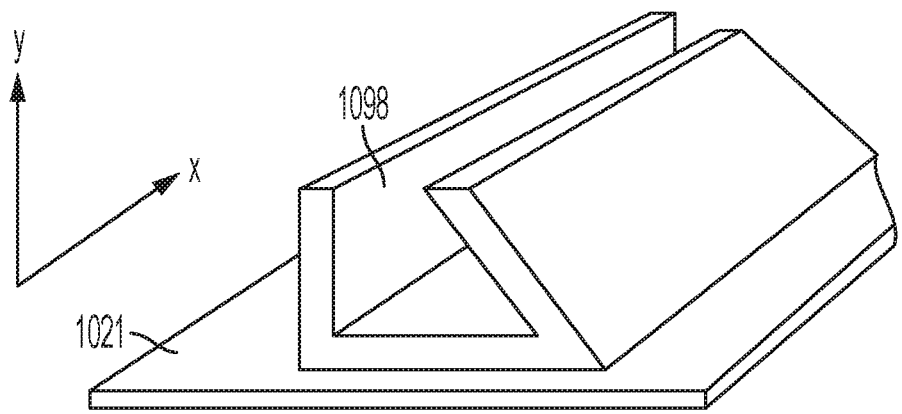
FIGS. 10A and 10B illustrate one example of a keyed protrusion on an item and complementary channel in the structure that sets the orientation of the item in the structure in accordance with some embodiments.
Figure 10B:
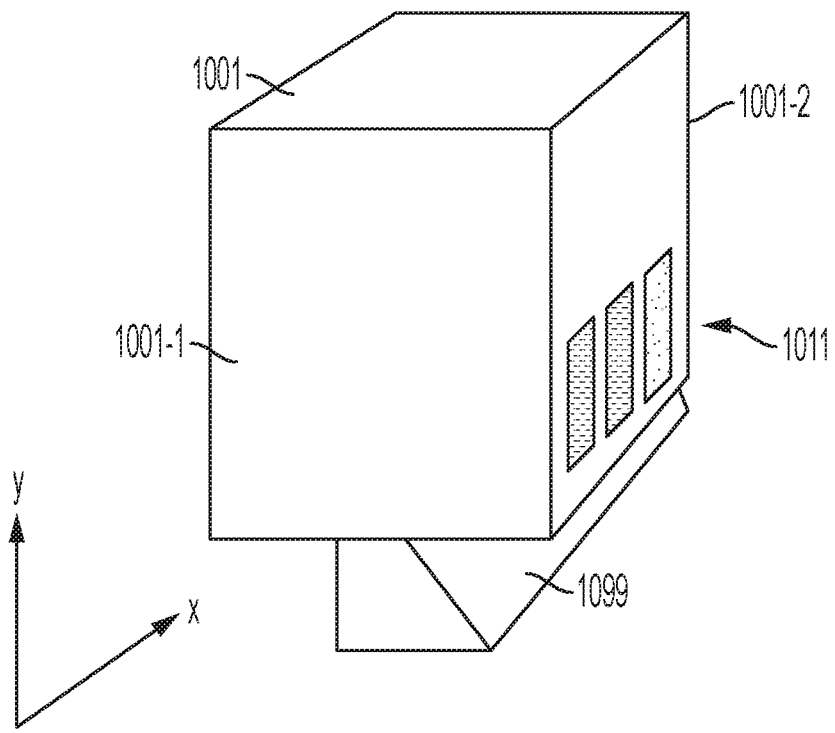

It can be useful to ensure that the item is oriented on the structure in a predetermined way. To this purpose, in some embodiments the item may include a feature that is compatible with a feature of the structure that sets the orientation of the item. For example, the item's feature may comprise a keyed protrusion that can be inserted into a compatible channel in the structure to set the orientation of the item in the structure. FIGS. 10A and 10B illustrate one example of a keyed protrusion 1099 on an item 1001 and complementary channel 1098 in the structure 1021 that sets the orientation of the item 1001 in the structure 1021. Due to the channel 1098 and protrusion 1099, when the item 1001 is placed in the structure 1021 along the x axis, the item 1001 is constrained to enter the structure 1021 from back 1001-2 to front 1001-1. Likewise, when the item 1001 is removed from the structure 1021 along the x axis, the item 1001 is constrained to leave the structure 1021 from front 1001-1 to back 1001-2. These constraints ensure that the regions or sensors of the identification element 1011 are encountered in the correct order and the processor can detect whether the item 1001 is being removed or replaced based on the sequence of waveforms included in the response signal.

Figure 10C:
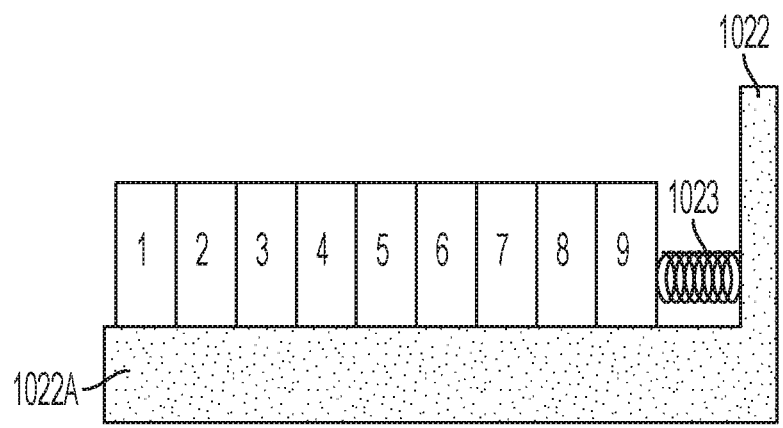
FIGS. 10C and 10D depict a structure that includes a biasing element that pushes items toward the front of the structure in accordance with some embodiments.
Figure 10D:
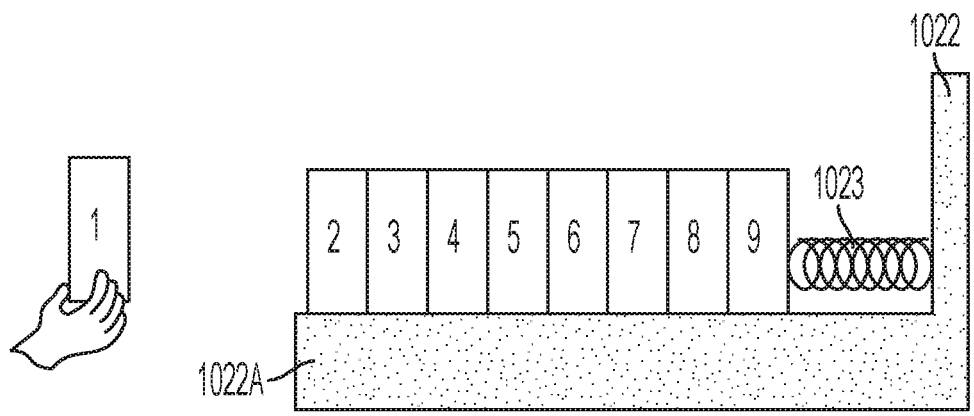

As depicted in FIGS. 10C and 10D, in some embodiments, a structure 1022 can include a spring 1023 or other type of biasing element arranged to push items (numbered 1-9 in FIGS. 10C and 10D) towards the front 1022a of the structure 1022. When a customer pulls the front item out (labeled as item 1), items 2-9 behind the front item 1 will move forward in the structure 1022.

Figure 11:
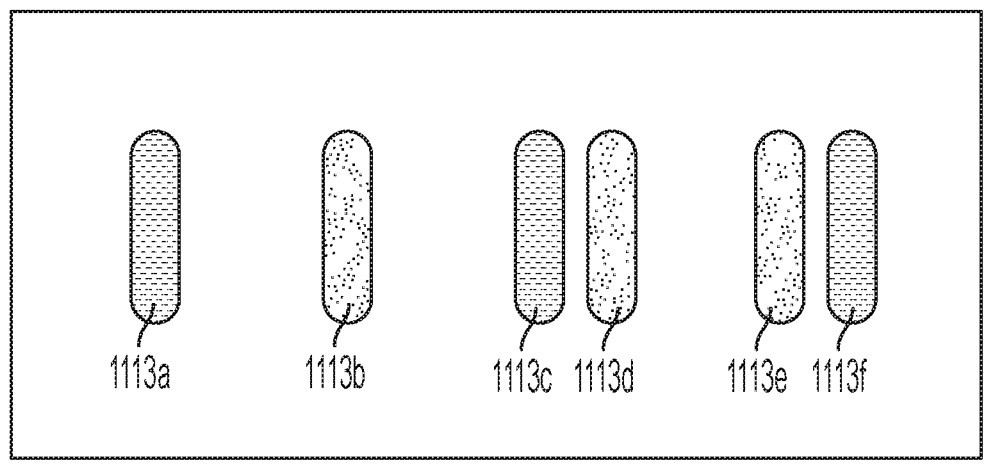
FIG. 11 shows capacitive touch sensors of an identification device that can be disposed on an item to identify the item as it is removed from or placed in a structure in accordance with some embodiments.
Figure 12:
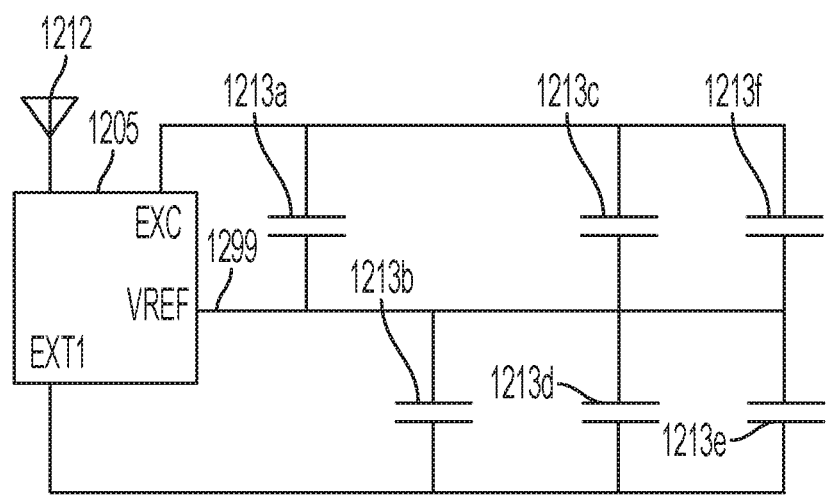
FIG. 12 provides an electrical schematic diagram of an example version of a transponder coupled to the touch sensors illustrated in FIG. 11.

FIG. 11 shows capacitive touch sensors 1113a through 1113f of an identification device that can be disposed on an item to identify the item as it is removed from or placed in the structure. FIG. 12 provides an electrical schematic diagram of an example version of a transponder 1205 coupled to the touch sensors 1113a through 1113f. The reader will appreciate that many schematic configurations for the disclosed device are possible and this is but one implementation discussed for purposes of illustration. In this particular configuration, the touch sensors 1113a-f are all connected to the same output signal line 1290, for example.

Each capacitive touch sensor 1113a-f includes first and second electrical conductors, e.g., electrically conductive traces, which form the plates of the capacitor separated by an electrically non-conductive gap. The capacitance of touch sensor 1113a is Ca; the capacitance of touch sensor 1113b is Cb, the capacitance of touch sensitive element sensor 1113c is Cc, the capacitance of touch sensitive element 1113d is Cd; the capacitance of touch sensitive element 1113e is Ce; and the capacitance of touch sensitive element 1113f is Cf.

In this particular example, the transponder 1205 has no internal source of power and harvests energy from the excitation signal transmitted by the reader (not shown in FIG. 12) to the input device 210. In the illustrated embodiment, the transponder 1205 uses the harvested energy to provide a sensor excitation voltage, e.g., an AC voltage (shown as EXC in FIG. 12) to the touch sensors 1113a-f. As indicated in FIG. 12, VREF is a reference voltage for the sensor excitation voltage. The output of the touch sensor 1213 is connected to the transponder 1205 at EXT1. The total equivalent capacitance ($C_{SENS}$) of the sensor capacitors (213a, 213c, and 213f) is Ca+Cc+Cf, and the total capacitance ($C_{REF}$) of the reference capacitance is Cb+Cd+Ce. The output of the touch sensor at EXT1 is characterized by the equation:

$$V_{EXT1} = V_{REF} \frac{C_{REF}}{C_{REF} + C_{SENS}}$$

For any of the touch sensors 1113a-f, when the touch implement is not present at the touch sensor, any capacitive coupling at the gap stays fairly constant. When the touch implement of the structure touches or nearly touches a touch sensor, the previously existing capacitive coupling is altered. The touch implement shunts a portion of the capacitive field whereby charge across the gap is altered. The variation in the capacitive coupling alters the current being carried in the sensor output and causes a variation in the electronic waveform at EXT1.

Figure 13:
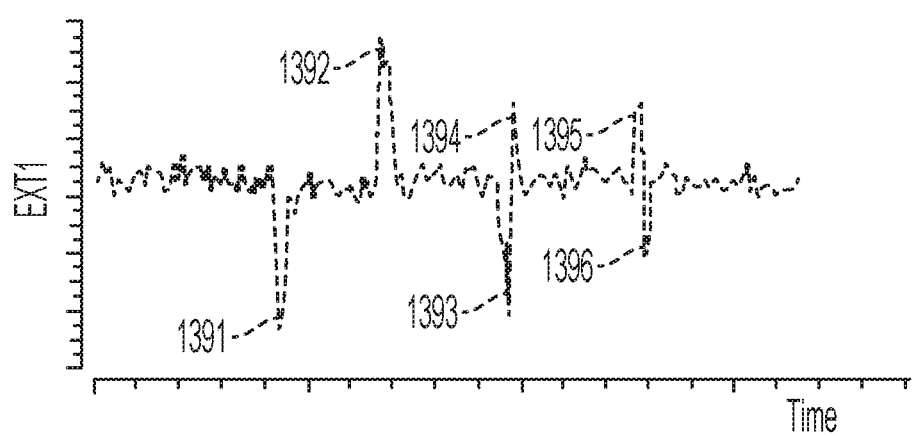
FIG. 13 shows the response signal of the identification device output as each capacitive sensor is activated in turn by a touch implement of a structure in accordance with some embodiments.

FIG. 13 shows the response signal of the identification device output at EXT1 as each capacitive sensor 1113a-1113f is activated in turn by the touch implement on the structure. As the touch implement passes sensor 1113a peak 1391 is generated; as the touch implement passes sensor 1113b peak 1392 is generated; as the touch implement passes sensor 1113c peak 1393 is generated; as the touch implement passes sensor 1113d peak 1394 is generated; as the touch implement passes sensor 1113e peak 1395 is generated; and as the touch implement passes sensor 1113f peak 1396 is generated. The sequence of waveforms 1391-1396 represents the multi-digit code that identifies the item associated with the touch sensors 1113a-f. The multi-digit code may also be encoded by different spacing between the touch sensor and/or different sizes of the touch sensors. The different spacing produces corresponding differing timing between the waveforms in the response signal and the different sizes of the touch sensors produces corresponding differing amplitudes of the waveforms. The processor may be capable of discriminating between removal of an item from the structure and placement of the item in the structure by the order of the waveforms generated by the touch sensors. For example, when the item is removed from the structure, the waveform sequence order may be waveform 1391, followed by waveform 1392, followed by waveform 1393, followed by waveform 1394, followed by waveform 1395, followed by waveform 1396 as shown in FIG. 13. When the item is replaced in the structure, the reverse waveform order would occur: waveform 1396 followed by waveform 1395 followed by waveform 1394 followed by waveform 1393 followed by waveform 1392 followed by waveform 1391. The processor may detect the order that the waveforms occur in the response signal to determine whether the item is being removed or replaced.

The item may include additional touch sensors that can be swiped by a consumer who interacts with the item as discussed in commonly owned U.S. patent application Ser. No. 16/589,676 filed on Oct. 1, 2019 which is incorporated herein by reference. Swiping the additional touch sensors can cause information about the item to be transmitted to the consumer's handheld device. U.S. patent application Ser. No. 6/589676 also discusses different configurations of capacitive sensors and groups of sensors that can be employed in the approaches above.

Figure 14:
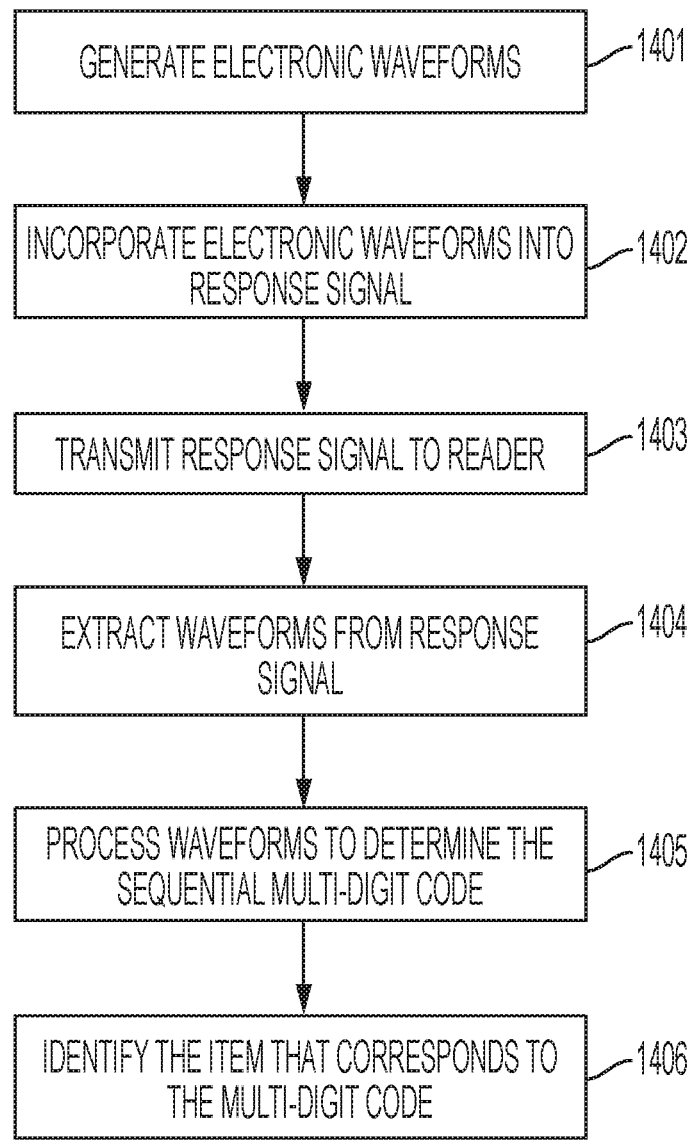
FIG. 14 is a flow diagram of a process of identifying items in accordance with some embodiments.

FIG. 14 is a flow diagram of a process of identifying items in accordance with some embodiments. The method includes generating 1401 electronic waveforms in response to a touch implement swiping on or near capacitive touch sensors disposed on the item as the item is removed from or placed in the structure. The electronic waveforms represent a sequential multi-digit code and are incorporated 1402 in a response input signal that is wirelessly transmitted 1403 to a reader. The electronic waveforms are extracted 1404 from the response signal. The sequential multi-digit code is determined 1405 based on the sequence of electronic waveforms in the response signal. The item that corresponds to the sequential multi-digit code is identified 1406. The system takes action e.g., displays information, makes a sound, logs consumer interaction, updates inventory etc., based on the item removed or replaced in the structure.

Figure 15:
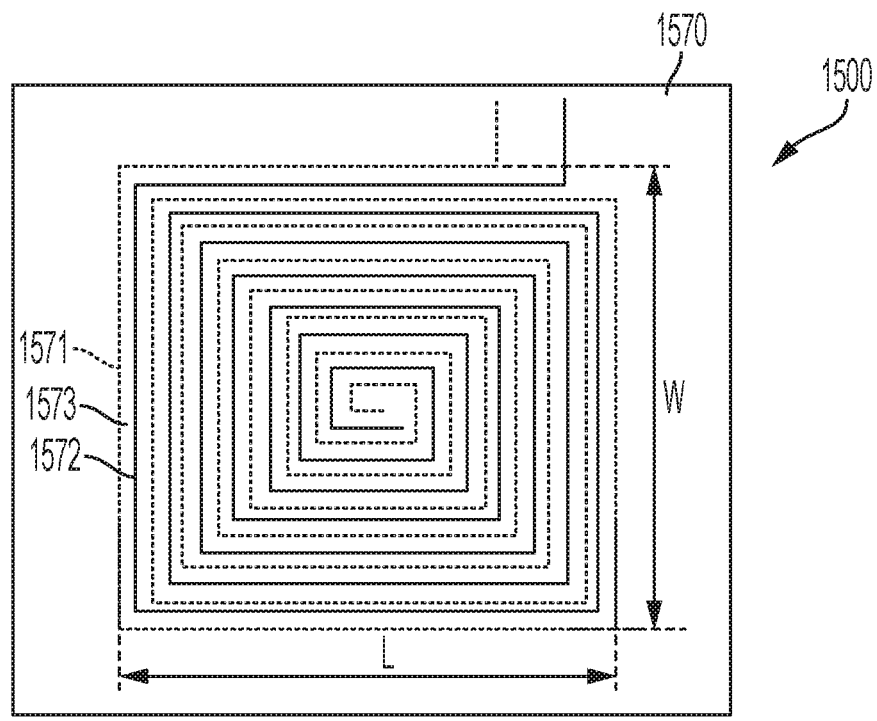
FIG. 15 is a diagram of two double wrapped planar coils that form a capacitive sensor in accordance with some embodiments.
Figure 16:
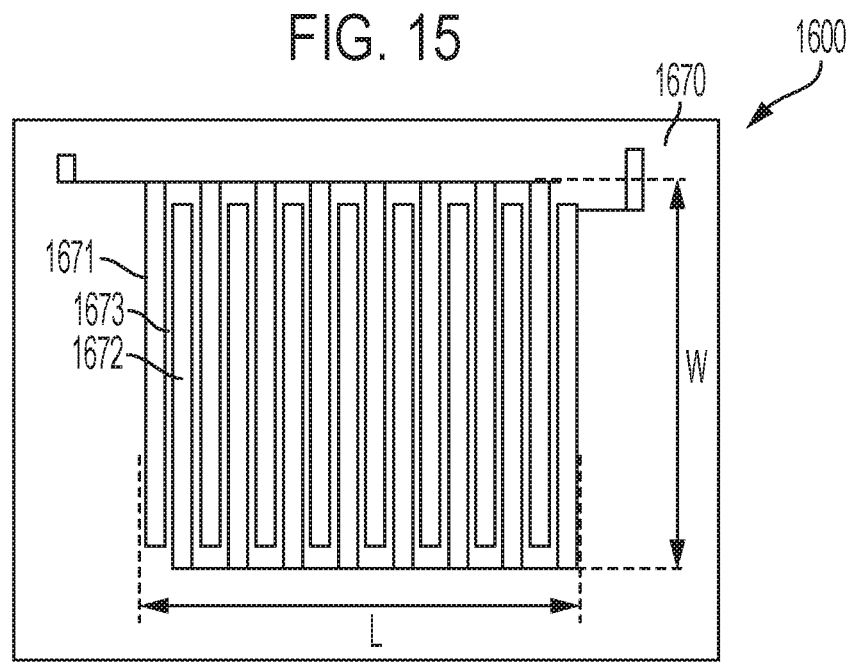
FIG. 16 is a diagram of interdigitated electrodes that form a capacitive sensor in accordance with some embodiments.

FIGS. 15 and 16 illustrate examples of capacitive sensors 1500, 1600 suitable for many applications including the applications discussed in FIGS. 1-14 herein. In a first embodiment, each electrical conductor 1571, 1572 of a capacitive sensor 1500 may be a planar coil. The two coils 1571, 1572 of the sensor 1500 can be a double wrapped and electrically isolated from one another by a gap 1573 as shown in FIG. 15. In some embodiments, the electrical conductors 1571, 1572 are implemented as conductive traces printed onto a substrate 1570. Additional details of double wrapped coils used for capacitive sensing are discussed in commonly owned U.S. Pat. No. 9,874,984 which is incorporated herein by reference.

The gap 1573 between the double wrapped coils 1571, 1572 can be about 3 μm to about 1 mm, e.g., about 90 μm, for example. The double wrapped coils 1571, 1572 can be approximately circular in shape, can be or rectangular in shape as illustrated in FIG. 15, or can have any other suitable shape. For circular-shaped coils, the diameter of each coil can range from about 50 μm to about 20 mm depending on the application. For rectangular shaped planar coils, the length, L, and width, W, of the rectangle can range between about 50 μm to about 20 mm depending on the application. The overall length of the coil conductors depends on the design of the gap, shape, and size of the coil. In some embodiments, the total diameter (or the length and width) of the double-wrapped coils may be about 3.4 mm and the total length of the gap may be about 426 mm (2 times the length of a coil).

As shown in FIG. 16, in some embodiments, the electrical conductors 1671, 1672 of a capacitive sensor 1600 may be co-planar interdigitated electrodes. The two interdigitated electrodes 1671, 1672 of the sensor are electrically isolated from one another by a gap 1673 as shown in FIG. 16. In some embodiments, the electrical conductors 1671, 1672 are implemented as conductive traces printed onto a substrate 1670.

The gap 1673 between the interdigitated electrodes 1671, 1672 can be about 3 μm to about 1 mm, e.g., about 90 μm, for example. The interdigitated electrodes 1671, 1672 can be approximately rectangular in shape as illustrated in FIG. 16, or can have any other suitable shape. The length, L, and width, W, of the rectangle formed by the interdigitated electrodes can range between about 50 μm to about 20 mm depending on the application. The overall length of each conductor depends on the design of the gap, shape, and size of the coil. In some embodiments, the total length of the gap between the interdigitated electrodes 1671, 1672 is about the number of the electrodes times the width, W.

The double-wrapped coils or interdigitated electrodes as illustrated in FIGS. 15 and 16 form a co-planar capacitor with a long gap between two neighboring conductors. The geometry provides a large capacitance change when an the sensor touches or comes close to the identification elements on items (see, e.g., FIGS. 1-8 and associated discussion in the disclosure) and/or when a touch implement of the structure touches or comes close to sensors of an identification device (see, e.g., FIGS. 9-13 and associated discussion in the disclosure). The large capacitance change yields efficient sensing and enhances signal/noise (S/N) ratio.

In various embodiments, a capacitive sensor comprising double wrapped coils or interdigitated electrodes can be patterned on a printable substrate. Techniques for patterning the conductive traces include, for example, inkjet printing, gravure printing, screen-printing, aerosol printing, and/or photolithography, among other patterning technologies. The printable substrate may be flexible or rigid. The printable substrate can include a polymeric material, such a polyethylene naphthalate (PEN), polyethylene terephthalate (PET), polymide, etc. In some embodiments the substrate may comprise paper, or woven or non-woven fabrics, for example. The material of the traces that form the coils or electrodes may be a flexible electrically conductive material. The flexible conductive material of the coils or electrodes may include silver, gold, copper, or conductive carbon, among others.

In some embodiments, a first conductor of a capacitive sensor, e.g., coil or electrode is deposited, e.g., printed, on a substrate and a second conductor of the capacitive touch sensitive element is deposited, e.g. printed, on the same substrate but without touching the first coil. In alternative embodiments, the first conductor of the capacitive sensor is deposited, e.g., by printing, on a first substrate and a second conductor of the capacitive touch sensitive element is deposited on a different second substrate. In further alternative embodiments, the first conductor of the capacitive sensor and second conductor of the capacitive sensor are deposited sequentially; simultaneously; parts of the two conductors are printed and then the rest of the conductor parts are printed; or by any other useful printing order.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A system comprising:
a structure configured to hold a plurality of items;
at least one capacitive sensor; and
an item scanner configured to generate a sensor signal when the item scanner scans the items, wherein the sensor signal is generated in response to relative movement between the at least one capacitive sensor and identification elements disposed on the items held by the structure, each identification element representing a multi-digit code, wherein the capacitive sensor touches the identification elements during the relative movement, and further wherein the item scanner is further configured to scan the items in response to a trigger comprising a signal from a sensor that senses that an item has been removed from the structure or placed in the structure;
wherein the sensor signal generated by the item scanner when the item scanner scans the items comprises sequences of waveforms, each sequence of waveforms includes the multi-digit code that identifies one of the items.

2. The system of claim 1, wherein each identification element comprises multiple regions including a first region having a first dielectric constant and a second region having a second dielectric constant that is different from the first dielectric constant.

3. The system of claim 1, wherein each identification element comprises multiple regions, a first region having a first width and a second region having a second width that is different from the first width.

4. The system of claim 1, wherein each identification element comprises multiple regions, a first set of regions having a first spacing and a second set of regions having a second spacing that is different from the first spacing.

5. The system of claim 1, wherein the structure comprises a shelf and the item scanner is moved by a motor-driven mechanism relative to the shelf.

6. The system of claim 1, further comprising a processor configured to:
extract the multi-digit codes from the sensor signal; and
provide information about items removed from or placed on the structure based on the multi-digit codes.

7. The system of claim 6, wherein the processor is configured to:
  compare the codes extracted from the response signal to an inventory of codes; and
  identify one or more items that have been removed from or placed on the structure based on the comparison.

8. The system of claim 6, wherein the processor logs consumer interactions with one or more of the items based on removal of the one or more items from the structure and/or placement of the one or more items in the structure.

9. The system of claim 6, further comprising an output device coupled to the processor, the output device configured to provide the information about the item to a consumer based on the code.

10. The system of claim 9, wherein the output device wirelessly transmits the information to a handheld device.

11. The system of claim 1, wherein the sensor comprises an optical sensor.

12. The system of claim 1, wherein the sensor comprises a magnetic sensor.

13. A method comprising:
  in response to a trigger comprising a signal from a sensor that senses that an item has been removed from a structure or placed in the structure, scanning items held on the structure by causing relative movement between a capacitive sensor and identification elements disposed on items held on a structure, each identification element representing a multi-digit code, wherein the capacitive sensor touches the identification elements during the relative movement; and
  in response to relative movement between the capacitive sensor and the identification elements, generating a sensor signal comprising sequences of waveforms, each sequence of waveforms representing a multi-digit code identifying one of the items.

14. The method of claim 13, further comprising:
  extracting multi-digit codes from the sensor signal; and
  providing information about one or more items removed from or placed on the structure based on the multi-digit codes.

15. The method of claim 14, further comprising logging consumer interactions with the one or more items based on removal of the one or more items from the structure and/or placement of the one or more items in the structure.

* * * * *